United States Patent [19]
Howell

[11] 3,825,165
[45] July 23, 1974

[54] EXPLOSIVE WELDING APPARATUS FOR PIPE

[75] Inventor: William G. Howell, Lakewood, Colo.

[73] Assignee: Esso Research and Engineering Company, Linden, N.J.

[22] Filed: Aug. 24, 1973

[21] Appl. No.: 391,363

Related U.S. Application Data

[63] Continuation of Ser. No. 252,820, May 12, 1972, abandoned.

[52] U.S. Cl. ............... 228/50, 29/200 P, 29/470.2, 228/3, 269/48.1
[51] Int. Cl. .......................... B23k 5/22, B23k 9/02
[58] Field of Search ....................... 228/3, 4, 44, 50; 269/48.1; 29/200 P, 200 J, 237, 470.2

[56] References Cited
UNITED STATES PATENTS

| | | | |
|---|---|---|---|
| 1,878,725 | 9/1932 | Stovall | 228/50 |
| 2,167,896 | 8/1939 | Graham et al. | 228/50 |
| 2,615,413 | 10/1952 | Adams et al. | 113/103 |
| 2,977,916 | 4/1961 | Hawkins | 269/48.1 |
| 3,498,518 | 3/1970 | Wheeler et al. | 228/50 |
| 3,563,713 | 2/1971 | Rudd | 29/470.2 |
| 3,645,435 | 2/1972 | Doherty, Jr. et al. | 228/3 |

Primary Examiner—J. Spencer Overholser
Assistant Examiner—Robert J. Craig
Attorney, Agent, or Firm—Thomas B. McCulloch; F. Donald Paris

[57] ABSTRACT

An expandable mandrel for explosive welding of pipe is formed of a plurality of opposing pairs of arcuate segmented tapered members slidably arranged on each other and adapted when compressed to form a hollow cylindrical mandrel. Plate members on each end of the mandrel angularly arranged relative to each other have resilient means between the plate members and the mandrel which are compressed to compress the segments. The mandrel is equipped with means for movement through pipe sections.

31 Claims, 20 Drawing Figures

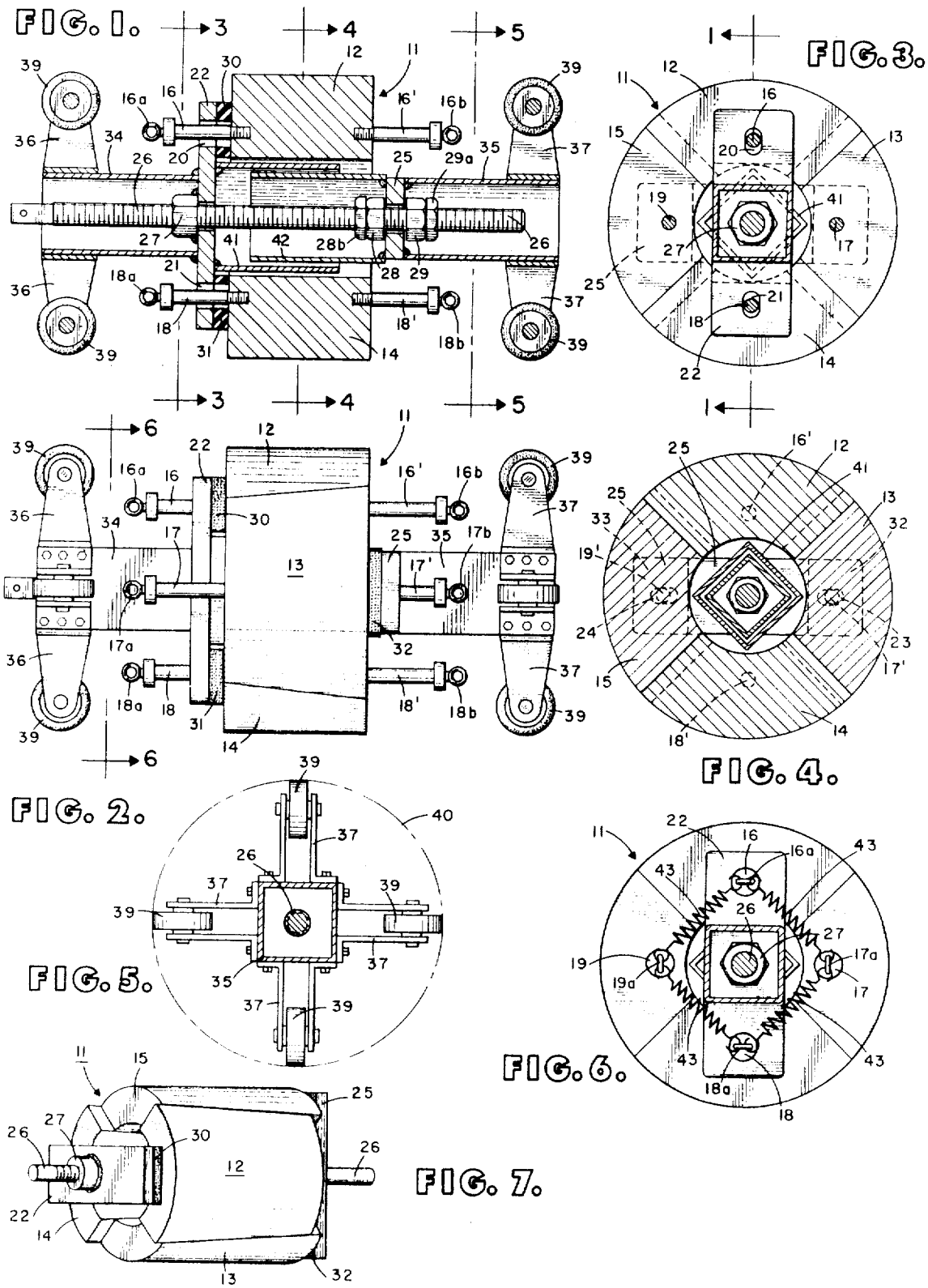

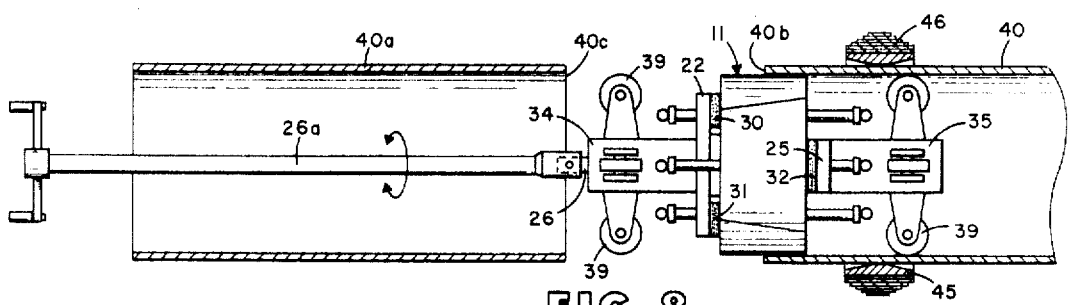
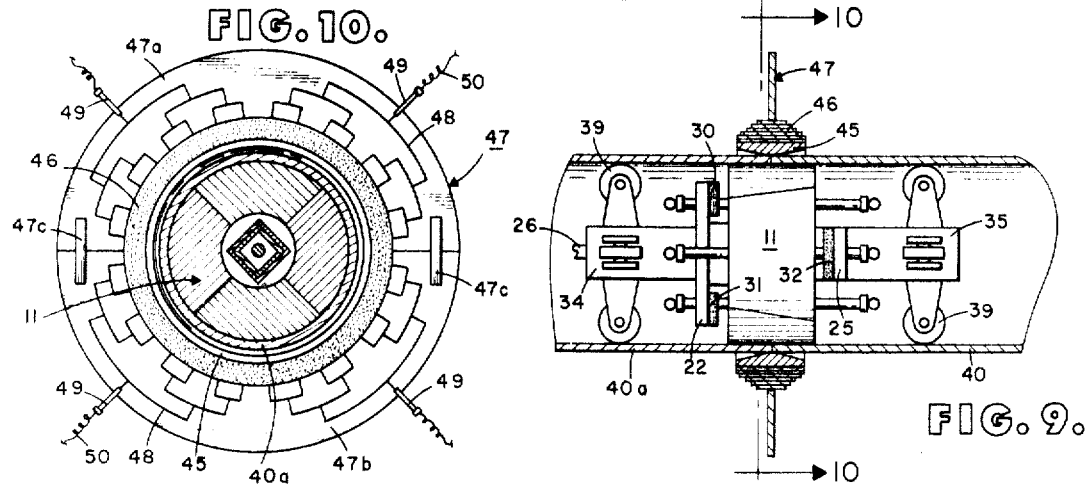
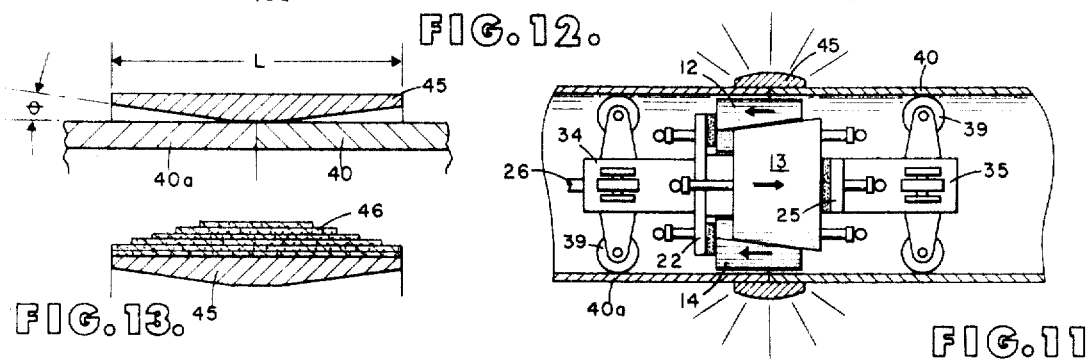
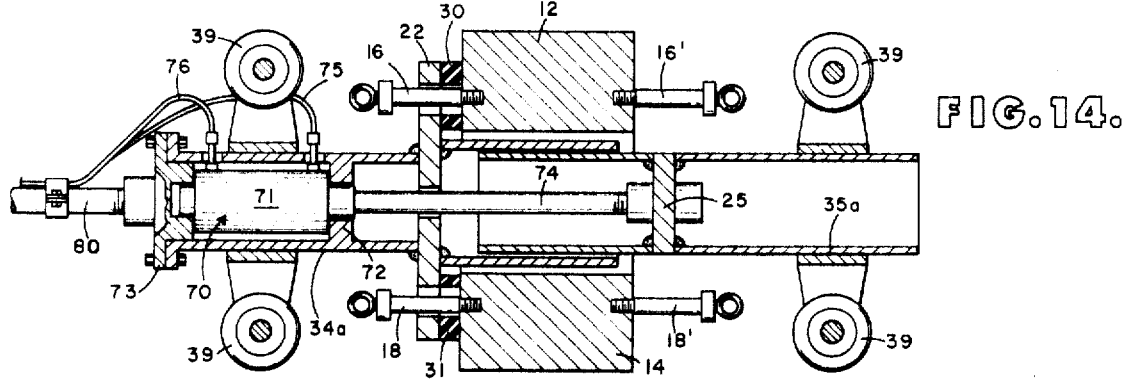

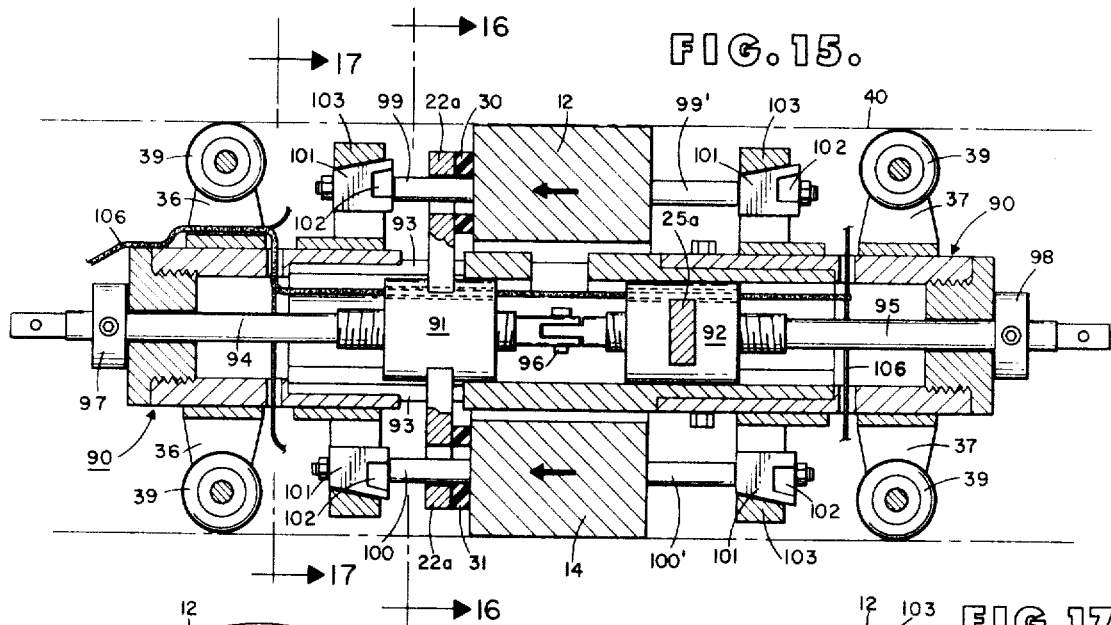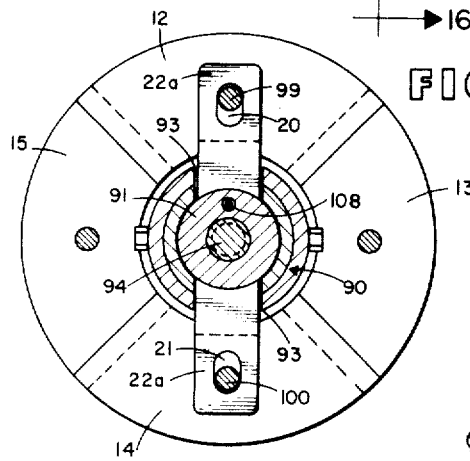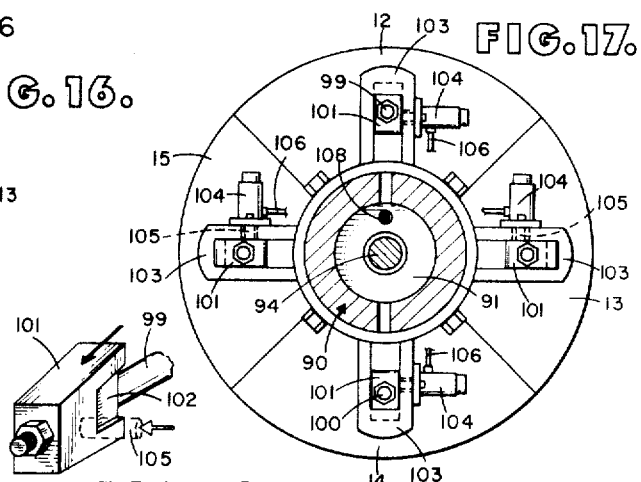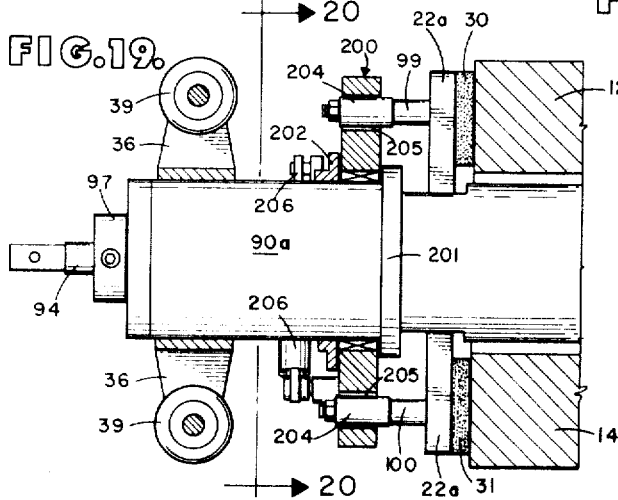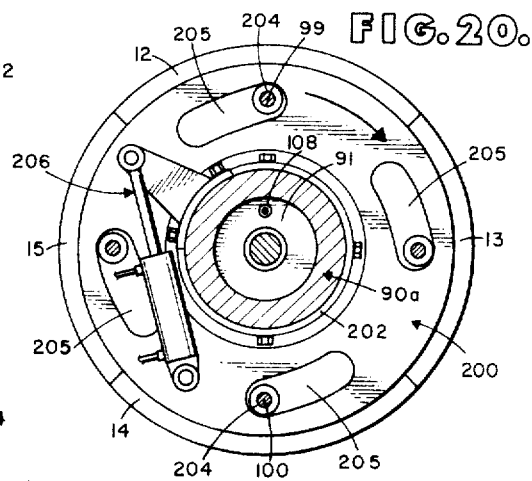

EXPLOSIVE WELDING APPARATUS FOR PIPE

This is a continuation of application Ser. No. 252,820 filed May 12, 1972 now abandoned.

CROSS REFERENCE TO COPENDING APPLICATIONS

This application is copending with the following applications, all of which are commonly assigned to the assignee of the instant application:

1. Ser. No. 252,678, filed May 12, 1972 in the names of William G. Howell, Steve H. Carpenter, and Henry E. Otto, and entitled EXPLOSIVE WELDING OF PIPE WITH EXPLOSIVE MEANS.
2. Ser. No. 252,821, filed May 12, 1972 in the names of William G. Howell, Theodore A. Espinoza, and Robert H. Wittman, and entitled WELDING OF PIPE BY USE OF EXPLOSIVES.
3. Ser. No. 252,641, filed May 12, 1972 in the names of Robert H. Wittman and William G. Howell and entitled WELDING OF HOLLOW CYLINDERS SUCH AS PIPE.

BACKGROUND OF THE INVENTION

1. Field of the Invention

The present invention is directed to explosive welding of pipe. More particularly the invention is concerned with an expandable mandrel for explosive welding of pipe. In its more specific aspects, the invention is directed to apparatus for explosive pipe welding in which a mandrel in the pipe prevents collapse of the pipe and is released for movement of the mandrel.

2. Description of the Prior Art

Welding of sections of pipe together by the action of explosives is well known. It has also been taught to use interiorly arranged mandrels in welding of pipe to prevent collapse thereof. The prior art also teaches the use of pipe collars for welding pipe by explosive action. Such collars have been formed to provide an angle with the exterior of the pipe but the collars are of the same thickness throughout and so is the explosive employed. Likewise high explosives have been arranged on the exterior of the collar as a cord which is detonated. None of the prior art, however, teaches or makes obvious the present invention wherein an expandable and compressible mandrel is employed which is easily movable through the pipe after weldment of one section to another.

Moreover, the prior art does not teach the use of such a mandrel with a particular type of collar and arrangement of explosive or use of the mandrel, collar, and a particular form of explosive

SUMMARY OF THE INVENTION

The present invention may be briefly described and summarized as involving a hollow expandable mandrel which is useful in explosive welding of pipe sections together. In the present invention, the hollow mandrel is placed within abutting pipe sections having a collar circumferentially embracing the abutting ends of the pipe at least adjacent the center of the collar. The ends of the pipe may be buffed to clean metal. The collar is interiorly formed to have a tapered shape such that the ends thereof are of a lesser thickness than the center. The outer surface of the collar is cylindrical and on it is placed a formed mass of high explosive which covers the collar and which is layered, stepped, molded, mounded, cast, or formed in any shape such that the thickness of the high explosive mass is greater at the center thereof than at its outer periphery. Arranged in explosive contact with the high explosive is a high explosive pattern of explosive mounted on a suitable planar surface which may be and preferably is destructive by the explosive. The high explosive mass on the collar is contacted at a plurality of points on the periphery of the explosive mass by separated or buffered strips of high explosive arranged on the planar surface leading to detonation means connected to a source of electrical energy such that on detonation of the ring or mass the collar is substantially instantaneously driven at a sufficient force against the abutting ends of the pipe sections to weld the inner surface of the collar thereto and weld the sections together; the force of the explosive causes the hollow mandrel segments to move from an expanded position such that it is of a lesser diameter and may be moved in the pipe to the next section to be welded onto the ever-increasing length of pipe line being formed.

VARIABLES OF THE INVENTION

The mandrel is suitably formed of at least two pairs of opposing tapered thick-walled pipe sections. While four sections are preferred and most desirable for 10–14 inch pipe and the like, a greater number of opposing pairs of segments may be used for larger pipe. Likewise, a plate on each end may be used with four segments: a greater even number of pairs of segments may require a greater number of plates to cause the tapered segments to be compressed into a cylindrical shape and expand against the inner surface of the pipe sections to be welded together. Four, six, eight, or a greater number of segments may be used with a plate on one end for each pair of segments. The plates are suitably angularly disposed relative to each other and for two pairs of segments may be arranged 90° with respect to each other. The angles for a greater number of pairs will depend on the number of pairs and generally will be less than 90° relative to each other.

The high explosive used in the mass on the collar and in the pattern may be any one of a number of high explosives such as, but not limited to, Detasheet "C" which is 63 percent by weight PETN, 7 percent by weight nitrocellulose and 30 percent polymeric materials and has a specific gravity of 1.48, a detonation velocity of about 23,000 feet per second, and is currently supplied on the market in rubbery sheet form, pentaerythritol tetranitate (PETN) with red lead and a binder composed of a mixture of butyl rubber and polymers of $\beta$- pinene, TNT, cyclomethylene (RDX), Pentolite which is a 50:50 mixture of TNT and PETN, amatol, a 50:50 mixture of ammonium nitrate and TNT, and other well known high explosives and mixtures thereof which may be shaped or formed on the collar as will be described more fully hereinafter.

Explosives should be selected having detonation velocities within the range from about 15,000 to about 30,000 feet per second. Generally, explosives having detonation velocities within the range from about 23,000 to about 30,000 feet per second may be used in the pattern and explosives having detonation velocities within the range from about 15,000 to 23,000 feet per second in the mass or ring. However, explosives having detonation velocities within the range of about 15,000 to about 30,000 feet per second may be used in both.

The high explosive shaped or formed or otherwise placed on the collar may have a thickness at least adjacent its center about 200 percent to about 100 percent of the thickness of the sleeve or collar at least adjacent its center and a thickness adjacent its ends about 200 percent to about 100 percent of the collar at least adjacent the ends of the collar. The high explosive may be shaped, formed, cast, or molded, layered, stepped, triangular, conical, truncated conical, or mounded in cross-section.

The planar surface may be formed of plywood and the like, or of a suitable plastic material, or other destructible material of light weight. The surface may be circular with a concentric circular opening conforming to the outer circumference of the high explosive on the pipe collar and may be made of two or more sections which are easily connectible together with a fastener means which simply may be adhesive tape or latches, and the like.

The size of the pipe which may be welded may vary from about 2 to about 48 inches in diameter with collars corresponding in size to weld the ends of the pipe together, but larger diameters of pipe may be used.

The amount of high explosive to be employed will vary, of course, with the size of the pipe collar and the detonation velocity of the explosive. However, the high explosive ring on the collar may have a thickness at the center of the collar sufficient to provide from about 4 to about 32 grams per square inch down to a thickness of from about 2 to about 16 grams per square inch at the ends or edges of the collar. For example, in welding nominal 12 inch pipe and employing Detasheet "C" explosive, the explosive would have a thickness at the center of the collar of about 10 to about 12 grams per square inch and at the ends or edges of the collar from about 4 to about 6 grams per square inch.

The collar may have a thickness at the center substantially the same as or slightly larger than the wall thickness of the pipe sections tapering on its inner surface to about one-half the pipe sections wall thickness.

The center inner surface of the collar or sleeve may be from about 1/16 inch to about 1 inch in width, while the inner tapered surfaces may each be from about 45 percent to about 48 percent of the length of the collar. For example, a 12-inch pipe may require a collar about 4 inches length while a 48 inch collar may require a collar of about 4 to about 6 inches length. A nominal 2 inch pipe may require a collar of about 2 inches length, whereas pipe of nominal 20 inches diameter may require a nominal 4 inches length collar.

BRIEF DESCRIPTION OF THE DRAWING

The present invention will be further described and illustrated by reference to the drawing in which:

FIG. 1 is a sectional view of the mandrel;

FIG. 2 is side elevational view of the mandrel;

FIG. 3 is a view partly in section of the mandrel taken along the lines 3—3 of FIG. 1;

FIG. 4 is a sectional view of the mandrel taken along the lines 4—4 of FIG. 1;

FIG. 5 is a sectional view of the mandrel taken along the lines 5—5 of FIG. 1;

FIG. 6 is a sectional view showing the arrangement taken along the lines 6—6 of FIG. 2 of the tension members not shown in FIGS. 1 and 2;

FIG. 7 is a schematic view illustrating the mandrel in non-compressed position apart from other appurtenances;

FIG. 8 is a view showing positioning of the mandrel in pipe sections to the welded;

FIG. 9 is a view illustrating the pipe sections of FIG. 8 in position to be welded;

FIG. 10 is a view taken along lines 10—10 of FIG. 9 showing the pipe collar and explosive arrangement;

FIG. 11 shows the welding of the pipe sections of FIGS. 8 and 9;

FIG. 12 illustrates an enlarged view of the pipe collar of FIGS. 9, 10 and 11 before explosive welding;

FIG. 13 illustrates an enlarged view of the pipe collar and explosive of FIGS. 9 and 10;

FIG. 14 illustrates another means for manipulating the segments of the mandrel;

FIGS. 15, 16, 17, and 18 show still another modification of the device; and

FIGS. 19 and 20 illustrate an alternate means for locking the segments in their retracted position.

DESCRIPTION OF THE PREFERRED EMBODIMENTS

Referring now to the drawing and particularly to FIGS. 1 to 7, numeral 11 designates the pipe mandrel formed of tapered segments 12, 13, 14, and 15. The taper of the segments may be at an angle from about 1° – 30° but preferably is at an angle of about 7° – 8° with the longitudinal axis. Connected to each end of segments 12, 13, 14, and 15 are longitudinal rod members 16, 16', 17, 17', 18, 18', 19 and 19', each provided on its free end with an eye means 16a, 16b, 17a, 17b, 18a, 18b, 19a and 19b, respectively.

Rod members 16 and 16' connect to opposite ends of segment 12 and likewise members 18 and 18' connect to segment 14. Rod members 17 and 17' connect to opposite ends of segment 13 and likewise rod members 19 and 19' connect to segment 15. Rod members 16 and 18 extend through openings 20 and 21 in plate 22 and rod members 17' and 19' extend through openings 23 and 24 in plate 25. The other rod members 17, 19, 16' and 18' are provided for use as will be described.

Passing through central openings in plates 22 and 25 in a threaded longitudinally axially extending rotatable rod member 26 which threadedly engages a nut 27 welded to plate 22. Positioned on rod 26 on opposite sides of plate 25 are nuts 28 and 29, locked in place by lock nuts 28a and 29a, whereby the nuts will rotate with rod 26 and cause longitudinal movement of plate 25. The nuts 28 and 29 also allow adjustment of the plates relative to each other.

The plates 22 and 25 are spaced from their respective segments and this space is provided with resilient pad means 30 and 31 and 32 and 33, the latter of which is shown in dotted lines in FIG. 4. The resilient means may be rubber, springs or other compressible means.

It will be seen that plate 22 with pads 30 and 31 operably engage one end of each of the segments 12 and 14, while plate 25 with pads 32 and 33 operably engage one end of each of the segments 13 and 15. The plates 22 and 25 are positioned on rod 26.

Connected to each plate 22 and 25 are members 34 and 35, respectively, on each end of which are yoke members 36 and 37 (FIGS. 1, 2 and 5) in the shape of a cross and formed to carry on their ends rollers or wheels 39 for movement of the mandrel 11 through a pipe section such as 40 shown in dotted line in FIG. 5.

Referring to FIGS. 1 and 4, telescoping members 41 and 42 are connected respectively to plates 22 and 25 and serve to provide stability for the segments 12, 13, 14, and 15, especially when large hollow mandrels are used with large sizes of pipe. It will be noted that the members 41 and 42 are square shaped in cross section and member 42 telescopes within member 41. This provides a spline assembly which extends through the central opening formed by the segments and allows longitudinal movement of the members 34 and 35 relative to each other. It will also be noted that the end of all the rod members 16 - 19' are provided with enlarged heads to prevent excess longitudinal retraction of the segments relative to each other.

In FIG. 6, tension means 43, not shown heretofore for reasons of clarity, are connected to eye means 16a, 17a, 18a, and 19a, and, of course, while not shown in this view similar tension means 43 are connected to eyes 16b, 17b, 18b, and 19b. These tension means 43 are provided to maintain and hold the segments 12, 13, 14 and 15 together, especially in their retracted position. The spring members tend to bias the segments toward the center axis of the assembly whereby they do not drag or contact the inside wall of the pipe when retracted.

FIG. 7 shows the mandrel 11 in its retracted or non-expanded position with the segments 13 and 15 moved relative to segments 12 and 14. FIGS. 1 to 4 and 6 show the segments 12-15 in their expanded and locked position.

Referring now to FIGS. 8-13 inclusive, the mandrel 11 is in the pipe section 40 and a collar 45 (FIG. 12) with a layered stack of high explosive such as Detasheet "C" 46 arranged thereon. It will be noted that the collar 45 is tapered interiorly its ends while the layered stack 46 has its greatest thickness corresponding to the greater thickness of the collar 45. The collar 45 defines angles of about 1° to 30° with the exterior of the pipe sections 40 and 40a with a preferred angle of 8°, with a detonation velocity of the explosive of approximately 23,000 feet per second. A suitable angle is about 5° to 15°.

The ends 40b and 40c of pipe sections 40 and 40a, respectively, are buffed to clean metal for about 2 inches from each of the ends and the ends butted together as shown in FIG. 9. The mandrel 11 is then centrally located thereunder with the segments thereof in their retracted position. When it is determined that the pipe sections are accurately aligned and the ends thereof in full abutment, the rod member 26 is rotated by crank rod 26a in one direction to draw the plates 22 and 25 toward each other, thereby expanding the tapered segments 12-15 against the inner wall of each of the pipe sections. At this time the collar 45 with explosive ring 46 is moved on the pipe to the position shown in FIG. 9. After the collar is properly positioned, the rod 26 is rotated in the opposite direction to move the plates 22 and 25 away from the segments a prescribed distance as shown in FIG. 9. The segments will maintain their expanded position against the inner wall of the pipes by means of the locking effect of the taper of the segments, and are in full 360° contact with the pipe wall. This complete contact prevents occurrences of deformities during the explosive welding process.

Thereafter, the planar surface 47 with the arrangement of Detasheet "C" strips 48 on planar surface 47 and detonators 49 are connected to a source of electrical energy not shown by leads 50 and strips 48 are placed in explosive contact with the layered mass 46, as shown in FIGS. 9 and 10 the two sections 47a and 47b being held together by connecting means 47c. The detonators 49 are simultaneously electrically energized and the high explosive mass 46 detonates and causes the collar 45 to be forced against pipe sections 4 and 40a with sufficient impact to cause the sections 40 and 40a to be welded together by the collar 45 as shown in FIG. 11. It will be noted from FIG. 11 that the force of the impact of the collar 45 against the pipe sections 40 and 40a and mandrel 11 causes the segments 13 and 15 to move relative to segments 12 and 14 diminishing the circumference of the mandrel 11 to its retracted position (FIG. 6 and 11) and allowing it to be moved to the open end of pipe section 40a for explosive weldment of another pipe section thereon.

FIG. 14 is a modification of the mandrel assembly of the previous figures. Instead of a screw rod means for relative movement of the plates 22 and 25 a piston rod and cylinder assembly generally designated 70 is provided. Piston cylinder 71 is positioned in the left end of member 34a and held in place by an annular shoulder 72 on the interior of member 34a and an end closure flange 73 bolted to the end of the member 34a. A piston rod 74 connected to a piston (not shown) extends through an axial opening in plate 22 with its free end connected to plate 25. A manipulator or pull rod 80 is connected to end flange 73 and extends through the pipe in the same manner as the crank rod 26a of the previous assembly. Fluid inlet and outlet connections on each end of the piston cylinder 71 are connected to fluid pressure conduits 75 and 76 and extend along pull rod 80 to a source of fluid pressure not shown. Fluid pressure through conduit 75 causes plates 22 and 25 to be drawn toward each other, therefore expanding the segments and pressure exerted through conduit 76 causes the plate to move away from each other and also away from the segments. The segments are drawn together toward the central axis of the assembly by spring members (not shown) 42 as in FIGS. 1-11.

FIGS. 15-18 illustrate still another modification of the present invention — a housing generally designated 90 has mounted about it the segments 12, 13, 14, and 15. The assembly is supported on rollers 39 as before. Although the housing 90 is composed of several sections for easy assembly, these sections will not be described. Plate 22a is attached to a sleeve 91, which is slidable in housing 90 and likewise plate 25a is attached to a sleeve 92 which is also slidable in housing 90.

Plate 22a extends through key slots 93 in opposite sides of housing 90 and likewise plate 25a which is 90° disposed in relation of plate 22a extends through key slots (not shown) in housing 90 on the opposite side of the segments. This allows the sleeves 91 and 92 to slide in housing 90 but prevents rotation of the sleeves. Extending through sleeve 91 and threadedly engaged thereto is a rod 94 which extends through the left end of housing 90 and is adapted to be connected to a crank rod such as 26a of FIG. 8. Likewise a threaded rod 95 extends through sleeve 92 and is operably threaded thereto. One end of rod 95 extends through the right end of housing 90 and is also adapted to be connected to a crank rod. This allows the assembly to be operated from either end. The opposite ends of the rods 94 and 95 are connected together as at 96 to allow easy assembly of the apparatus.

It will be noted that the rods are oppositely threaded where they pass through the sleeves 91 and 92 whereby rotation of the rods 94 and 95 in one direction will cause the plates to move toward each other and away from each other when the rods are rotated in the opposite direction. The inner connected rods 94 and 95 are held against longitudinal movement in the housing 90 by collars 97 and 98 which are fixedly attached to the rods and abut against each end of the housing. This arrangement allows the housing 90 to remain stationary and also provides uniform movement of the plates 22a and 25a toward and away from the ends of the segments.

The segments of FIGS. 15–18 are provided with rod members extending from each end thereof in the same manner as in the previous figures. Rod 99 and 100 of segments 12 and 14 extend through elongated openings in plates 22a and each have attached to the ends thereof a wedge block 101, each of which is provided with a locking recess 102 positioned 90° from the wedge surface of the block as shown more clearly in FIG. 18. The rods 99' and 100' extending from the other ends of segments 12 and 14 respectively are also provided with similar wedge blocks. The blocks extend through yoke members 103 which are positioned on housing 90 and which are provided with tapered surfaces which operably and matingly engage the wedge surfaces of the blocks 101. The segments in FIG. 15 are shown held in the expanded position by the plate members 22a and 25a, but when moved away from the segments, as previously shown in FIG. 9, the segments will move in the direction as illustrated by the arrows.

When the segments 12 and 14 move to the left to their retracted position on their own taper they will be forced toward the housing by the wedge blocks 101 moving along the tapered surface of the yoke members 103. As the segments 12 and 14 are moving along their own taper and segments 13 and 15 also move in the opposite direction together, the total movement of all segments in regards to movement toward the housing is double the movement if only one pair of segments moved. Therefore, the taper of wedge blocks 101 and yokes 103 must be twice the taper of the mating surfaces of the segments.

Attached to the side of each yoke member 103 is a locking cylinder 104 each of which is provided with a spring biased locking pin 105 which extends out the end of the cylinder through an opening in the side of the yoke and is biased to bear against the side of the wedge block 101 as shown in FIG. 18. As the wedge block 101 moves in the direction as shown by the arrow a predetermined distance the pin snaps into the locking recess 102, therefore locking the segments in the retracted position. Fluid pressure (from a source not shown) through conduits 106 retracts the locking pins 105 when the segments are to be again expanded. The fluid conduits 106 may extend through holes 108 in the sleeves 91 and 92 if locking cylinders are to be used on the yokes on both ends of the housing: however, locking cylinders on one end will be sufficient. As the segments 13 and 15 move in the opposite direction from 12 and 14 the mating surfaces of the block 101 and yokes 103 would be reversed. The wedge blocks 101 are interchangeable to match the taper of the yoke members.

Another means for holding the segments in their retracted position is shown in FIGS. 19 and 20.

A rotatable wheel 200 is concentrically mounted on and about housing 90a between a fixed annular shoulder 201 and an annular ring member 202. Instead of wedge blocks the rods 99 and 100 extending through plates 22a are provided on their free ends with sleeve rollers 204 which project through elongated cam slots or openings 205 formed in wheel 200. In the position shown, the segments are in their expanded position. The cam slots 205 are formed arcuately whereby one end is closer to the center of the wheel than is the other end. When the segments are in their retracted position the wheel is rotated on the housing in the direction of the arrow by means of a piston cylinder assembly 206, one end of which is attached to the housing 90a and the other end to the wheel 200 as shown. As the wheel is rotated clockwise the segments and rods are biased inwardly toward the housing and held there until the wheel is rotated in the opposite direction. A similar wheel assembly, although not shown, would be provided on the opposite end of the housing: whereby both ends of each segment would move inwardly toward the housing in unison. It would be obvious that other means may be used to rotate the wheel 200 and also other means for locking the segments may be used without departure from the scope of the present invention.

Thus, the present invention is quite important and useful. Pipe sections may be welded together with a minimum expenditure of equipment, effort and time. Pipe sections of 12–14 inches in diameter and of greater or lesser diameter are easily welded together. The mandrel of the present invention is quite advantageous and useful in welding, particularly explosive welding of pipe together using a pipe collar or sleeve. For example, in explosive welding in its compressed or expanded position the mandrel provides structural rigidity in support of the explosive impact or impulse from the pipe exterior. Also, it functions as a pipe line-up clamp by virtue of its providing 360° support. Moreover, the mandrel by virtue of its being relaxed, by sliding of the tapered segments on each other after the explosion, is easy to move in the pipe line and is also easy to place in operative position under abutting pipe ends and the collar or sleeve. After repeated use the mandrel maintains its mechanical integrity and is not deformed. This results primarily from movement of the tapered segments on explosive impact. The invention is, therefore, new, useful and unobvious since heretofore manpower and/or machines were necessary to weld pipe together.

It is understood, of course, that the rod 26a may be operated either manually or by power means (not shown) and that the mandrel 11 in its various embodiments may also be moved by power means (not shown). Likewise, pull rod 80 may be powered or manually operated. In fact, the several elements of the present invention which are shown as movable to position them may be powered.

The nature and objects of the present invention having been clearly described and illustrated and the best mode and embodiment contemplated set forth, what I wish to claim as new and useful and secure by Letters Patent is:

1. An expandable mandrel which comprises:

a plurality of opposing pairs of arcuate segmented tapered members slidably arranged on each other and adapted when compressed to form a hollow cylindrical mandrel;

at least a first rectangular plate member spaced longitudinally from at least one pair of said segmented members at a first end thereof;

at least a second rectangular plate member spaced longitudinally from at least another pair of said segmented members at a second end of said another pair, angularly arranged relative to said first rectangular plate member;

resilient means between each of said plate members and said pairs of segmented members;

a longitudinal means connected to said plate members, for compression of said segmented members, extending axially through the hollow mandrel and having means on one end for a detachable connection to an elongated member;

first and second longitudinally extending axial means each attached to the outer surface of one of said plate members; and a plurality of yoke means attached to said axial means, each of said yoke means being provided with means for moving said mandrel within a pipe section.

2. A mandrel in accordance with claim 1 in which the segmented members each have on each end longitudinally extending means connected thereto and to each other by tension members, the longitudinally extending means on at least opposing pairs of said segmented members extending through said plate members for movement of said plate members.

3. A mandrel in accordance with claim 1 in which a plate member on each end of said pairs of segmented members has a longitudinally extending telescoping member connected thereto and extending within the hollow mandrel such that a free end of one telescoping member telescopes within a free end of another telescoping member.

4. A mandrel in accordance with claim 1 in which the longitudinal means extending axially through the hollow mandrel is adjustably connected to at least one of said plate members.

5. A mandrel in accordance with claim 1 in which the means for moving the mandrel are roller means.

6. A mandrel in accordance with claim 1 in which the resilient means are rubber pads.

7. A mandrel in accordance with claim 1 in which the resilient means are springs.

8. A mandrel in accordance with claim 1 in which four arcuate segmented members are provided and the plate members are spaced each from two separate pairs of segmented members.

9. A mandrel in accordance with claim 1 in which the plate members are arranged 90° from each other.

10. An expandable mandrel in accordance with claim 1 in which:

a. the first rectangular plate member has longitudinally extending means extending therethrough from two of said opposed segmented members;

b. the second rectangular plate member is arranged 90° from the first rectangular plate member and has longitudinally extending means extending therethrough from two other opposed segmented members;

c. tension members are connected to the free ends of each two of said longitudinally extending means; an d. telescoping members extend within said segmented members and each connect by one end to one of said plate members for telescoping of a free end of each said telescoping member within said segmented members.

11. An expandable mandrel which comprises:

a plurality of opposing pairs of arcuate segmented tapered members slidably arranged on each other and adapted when compressed to form a hollow cylindrical mandrel;

first means spaced longitudinally from a pair of said segmented members at a first end thereof and having longitudinally extending means extending therethrough;

second means spaced longitudinally from and connected to another pair and having longitudinally extending means extending through said mandrel, said second means being arranged angularly relative to said first means;

resilient means between each of said spaced means and said pairs of segmented members;

means connected to said first and second means for compression of said pairs of segmented members; and a plurality of means attached to said mandrel for moving said mandrel within a pipe section.

12. A mandrel in accordance with claim 11 in which the compression means is hydraulic.

13. A mandrel in accordance with claim 11 in which the compression means is pneumatic.

14. A mandrel in accordance with claim 11 in which the compression means is mechanical.

15. A mandrel in accordance with claim 11 in which the means for moving the mandrel comprise at least a mounting member carried on a longitudinal member connected to said first and second means and roller means on the mounting member.

16. A mandrel in accordance with claim 11 in which the pair of segmented members are maintained together by a combination of pneumatic means and mechanical means.

17. A mandrel in accordance with claim 16 in which the mechanical means is a cam.

18. A mandrel in accordance with claim 16 in which the pneumatic means comprise piston means.

19. A mandrel in accordance with claim 11 in which the means for moving the mandrel comprise at least a mounting member carried on at least a longitudinal member connected to one of said first and second means and roller means on the mounting member.

20. A mandrel in accordance with claim 11 in which the means for moving the mandrel comprise at least a mounting member carried on at least a longitudinal member connected to carried by the mounting member in which a piston cylinder and a piston having a piston arm are arranged within said longitudinal member and said piston arm is connected to said first and second means for compression of said pairs of segmented members; and means are provided for moving said piston and piston arm in either direction.

21. A mandrel in accordance with claim 11 in which the longitudinally extending means are connected to the pairs of segmented members on each end thereof, the free ends of each said longitudinally extending means terminating in a block means arranged in a separate yoke member carried by said compression means, said block means and said yoke members comprising means for locking the pairs of segmented members in retracted position, said block means being provided with means for unlocking the pairs of segmented members for expansion.

22. A mandrel in accordance with claim 21 in which the locking and unlocking means comprise wedge blocks and locking pins, said locking pins being provided with fluid operated means for unlocking same.

23. A mandrel in accordance with claim 11 in which the compression means comprises a first and second axial interconnected rod means extending through said mandrel, each rod means extending through a separate sleeve and being oppositely threaded in its sleeve, said first and second means each being connected to one of said sleeves, each of said axial rod means being provided on a free end thereof with means for rotating same.

24. A mandrel in accordance with claim 11 in which the longitudinally extending means are connected to the pairs of segmented members on each end thereof, the free ends of each said longitudinally extending means terminating and projecting through cam slots on a rotatable plate means mounted on said compression means, said cam slots being arcuately formed whereby one end of each slot is closer to the center of the plate means, said plate means being rotated by power means to retract and expand the pairs of segmented members.

25. A mandrel in accordance with claim 24 in which the plate means is circular and in which piston cylinder means are provided to operate said power means.

26. A mandrel in accordance with claim 11 in which the pairs of segmented members are maintained together by a combination of hydraulic means and mechanical means.

27. A mandrel in accordance with claim 16 in which the hydraulic means comprise piston means.

28. A mandrel in accordance with claim 26 in which the mechanical means is a cam.

29. A mandrel adapted for use in the explosive welding of pipe and adapted for movement internally between adjoining pipe sections to be welded together, said mandrel being capable of movement between expanded and retracted positions and comprising:

a plurality of opposing pairs of arcuate segmented tapered members slidably arranged relative to each other and forming a hollow cylindrical mandrel when disposed in an expanded position;

each of said members having tapered sides in mating engagement with complementary tapered sides of adjacent members for enabling said members to self lock in their expanded position and having opposing end surfaces of dissimilar area for interacting with the axial shock waves from said explosive welding of the pipe to move said members to their retracted position; and means operably associated with said mandrel for permitting movement of the retracted mandrel within said pipe, whereby said mandrel supports the pipe wall and prevents excessive deformation thereof during the explosive welding process.

30. A mandrel according to claim 29 wherein adjacent faces of said segmented members are in contact when said mandrel is in its expanded position so that there is a continuous surface presented circumferentially about said mandrel for full contact with the surrounding pipe when located in said pipe.

31. A mandrel according to claim 29 wherein opposite ends of each of said members have substantially flat end surfaces disposed substantially perpendicular to the axis of said pipe sections.

* * * * *